United States Patent
Ida et al.

(10) Patent No.: US 10,620,514 B2
(45) Date of Patent: Apr. 14, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Kentaro Ida, Tokyo (JP); Takuya Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/070,692

(22) PCT Filed: Feb. 24, 2017

(86) PCT No.: PCT/JP2017/006993
§ 371 (c)(1),
(2) Date: Jul. 17, 2018

(87) PCT Pub. No.: WO2017/154611
PCT Pub. Date: Sep. 14, 2017

(65) Prior Publication Data
US 2019/0025681 A1 Jan. 24, 2019

(30) Foreign Application Priority Data
Mar. 10, 2016 (JP) .................. 2016-047658

(51) Int. Cl.
*G03B 21/14* (2006.01)
*H04N 5/74* (2006.01)
(Continued)

(52) U.S. Cl.
CPC .......... *G03B 21/147* (2013.01); *G03B 21/00* (2013.01); *G03B 21/14* (2013.01); *G03B 21/142* (2013.01);
(Continued)

(58) Field of Classification Search
CPC ... G09G 5/00; G09G 5/36; G09G 5/38; G03B 21/00; G03B 21/14; G03B 21/147; G03B 21/142; H04N 5/74; H04N 9/312; H04N 9/3114; H04N 9/31; G06T 7/521; G09B 5/00
See application file for complete search history.

(56) References Cited

U.S. PATENT DOCUMENTS

2006/0152682 A1* 7/2006 Matsuda ............. H04N 9/3185
353/40
2006/0181686 A1* 8/2006 Matsuda ............. G03B 21/14
353/69
(Continued)

FOREIGN PATENT DOCUMENTS

JP 2005-043570 A 2/2005
JP 2010-086928 A 4/2010
(Continued)

*Primary Examiner* — Isiaka O Akanbi
*Assistant Examiner* — Danell L Owens
(74) *Attorney, Agent, or Firm* — Paratus Law Group, PLLC

(57) ABSTRACT

The present technology relates to an information processing apparatus, an information processing method, and a program for enabling stabilization of a position of an image projected by a projector. The information processing apparatus includes an acquisition unit configured to acquire projection area information that is information regarding a range of a projection area of a projector, and an image control unit configured to control a display image range that is a range of contents to be displayed in the projection area on the basis of the projection area information. The present technology can be applied to an audio visual (AV) system using a drive-type projector or a handy-type projector, for example.

20 Claims, 12 Drawing Sheets

(51) Int. Cl.
   *G03B 21/00*    (2006.01)
   *G09G 5/36*     (2006.01)
   *G09G 5/00*     (2006.01)
   *G09G 5/38*     (2006.01)
   *H04N 9/31*     (2006.01)
   *G06T 7/521*    (2017.01)

(52) U.S. Cl.
   CPC ............ *G06T 7/521* (2017.01); *G09G 5/00* (2013.01); *G09G 5/36* (2013.01); *G09G 5/38* (2013.01); *H04N 5/74* (2013.01); *H04N 9/31* (2013.01); *H04N 9/312* (2013.01); *H04N 9/3114* (2013.01)

(56) References Cited

U.S. PATENT DOCUMENTS

| | | | | |
|---|---|---|---|---|
| 2013/0063646 A1* | 3/2013 | Ueno | .................... | G03B 21/142 348/333.1 |
| 2015/0042559 A1* | 2/2015 | Li | ......................... | G06F 3/1438 345/156 |
| 2015/0195479 A1* | 7/2015 | Sano | .................... | H04N 9/3185 348/745 |
| 2015/0222842 A1* | 8/2015 | Kwong | ................ | H04N 9/3182 348/745 |
| 2016/0330433 A1* | 11/2016 | Shen | ........................ | G01S 17/46 |

FOREIGN PATENT DOCUMENTS

| | | |
|---|---|---|
| JP | 2011-175051 A | 9/2011 |
| JP | 2011-248548 A | 12/2011 |
| JP | 2013-020199 A | 1/2013 |
| JP | 2013-109184 A | 6/2013 |
| JP | 2015-119419 A | 6/2015 |
| WO | WO 2008/004438 A1 | 1/2008 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/006993 (filed on Feb. 24, 2017) under 35 U.S.C. § 371, which claims priority to Japanese Patent Application No. 2016-047658 (filed on Mar. 10, 2016), which are all hereby incorporated by reference in their entirety.

TECHNICAL FIELD

The present technology relates to an information processing apparatus, an information processing method, and a program, and in particular, to an information processing apparatus, an information processing method, and a program that stabilize a position of an image projected by a projector.

BACKGROUND ART

Conventionally, a drive-type projector capable of varying a projecting direction by changing a direction of the projector by a drive unit rotatable in a pan direction (horizontal direction) and a tilt direction (vertical direction) has been proposed (for example, see Patent Document 1).

CITATION LIST

Patent Document

Patent Document 1: Japanese Patent Application Laid-Open No. 2010-86928

SUMMARY OF THE INVENTION

Problems to be Solved by the Invention

For example, in the case of performing projection mapping using a drive-type projector, the position of an image (contents in the image) to be projected in a display space is sometimes determined in advance. In this case, a range of the image to be projected needs to be moved in accordance with the direction of the drive-type projector. That is, in the case where a projection area is moved as the direction of the drive-type projector is changed, the range of the image to be projected needs to be moved in accordance with the position of the projection area on the destination. At this time, if a time lag between the movement of the projection area and the movement of the range of the image to be projected becomes large, the image is not localized at a predetermined position and shift and shake of the image occur.

Therefore, the present technology is to stabilize the position of an image projected by a projector.

Solutions to Problems

An information processing apparatus according to one aspect of the present technology includes an acquisition unit configured to acquire projection area information that is information regarding a range of a projection area of a projector, and an image control unit configured to control a display image range that is a range of contents to be displayed in the projection area on the basis of the projection area information.

The information processing apparatus can cause the projector to project an image of a first color corresponding to one image that configures an image of the contents, and an image of a second color corresponding to the one image and different from the first color at different times, and can cause the image control unit to control a position of the image of the first color or the image of the second color on the basis of the projection area information.

The information processing apparatus can cause the image control unit to perform control such that positions of the image of the first color and the image of the second color, the positions being viewed from the projector, are further separated as a speed at which the projection area of the projector moves becomes faster.

The information processing apparatus can cause the projector to project an image of a first color corresponding to one image that configures an image of the contents, and an image of a second color corresponding to the one image and different from the first color at different times, and can cause the image control unit to stop movement of the projector in a projecting direction by a drive unit that controls the projecting direction of the projector until projection of the image of the first color and the image of the second color corresponding to the one image is completed.

The information processing apparatus can cause the image control unit to stop the movement of the projector in the projecting direction by the drive unit before starting projection of the one image, and to resume the movement of the projector in the projecting direction by the drive unit after the projection of the image of the first color and the image of the second color corresponding to the one image is completed.

The information processing apparatus can cause the projection area information to be calculated on the basis of control information of a drive unit that controls a projecting direction of the projector.

The information processing apparatus can cause the projection area information to include a prediction value regarding the range of the projection area based on the control information and a characteristic of the drive unit.

A calculation unit configured to calculate the projection area information on the basis of the control information of the drive unit can be further provided.

The projector and the drive unit can be further provided.

The information processing apparatus can cause the projection area information to be calculated on the basis of information from a sensor that detects a motion of the projector.

The information processing apparatus can cause the projection area information to include a prediction value regarding the range of the projection area based on the information from the sensor.

A calculation unit configured to calculate the projection area information on the basis of the information from the sensor can be further provided.

The projector and the sensor can be further provided.

The information processing apparatus can cause the projection area information to include at least one of information indicating a position of the projection area and information indicating a moving direction and a moving amount of the projection area.

The information processing apparatus can cause the position of the projection area, or the moving direction and the moving amount of the projection area to be calculated on the basis of a distance between the projector and the projection area based on depth information of a projection target area serving as a target on which an image is projected.

A map generation unit configured to generate a map including the depth information of the projection target area can be further provided.

The information processing apparatus can cause the image control unit to control the display image range on the basis of image position information indicating a display position of an image set in advance to the projection target area.

The information processing apparatus can cause the image control unit to set the display image range on the basis of the projection area information, and can cause the image control unit to cause the projector to project an image corresponding to the set display image range.

An information processing method of one aspect of the present technology includes an acquisition control step of controlling acquisition of projection area information that is information regarding a range of a projection area of a projector, and an image control step of controlling a display image range that, is a range of contents to be displayed in the projection area on the basis of the projection area information.

A program of one aspect of the present technology causes a computer system to execute processing including an acquisition control step of controlling acquisition of projection area information that is information regarding a range of a projection area of a projector, and an image control step of controlling a display image range that is a range of contents to be displayed in the projection area on the basis of the projection area information.

In one aspect of the present technology, projection area information that is information regarding a range of a projection area of a projector is acquired, and a display image range that is a range of contents to be displayed in the projection area is controlled on the basis of the projection area information.

Effects of the Invention

According to one aspect of the present technology, a position of an image projected by a projector can be stabilized.

Note that the effects described here are not necessarily limited, and any of effects described in the present disclosure may be exhibited.

MODE FOR CARRYING OUT THE INVENTION

Hereinafter, a mode for carrying out the invention (hereinafter referred to as "embodiment") will be described in detail with reference to the drawings. Note that the description will be given in the following order.

1. Embodiment
2. Modification

Note that, hereinafter, the term "contents" is a concept including not only images (still images, moving images, and the like) but also parts such as characters and icons, and including a state (data) before becoming an image.

1. Embodiment

Configuration Example of AV System 10

Figure 1:
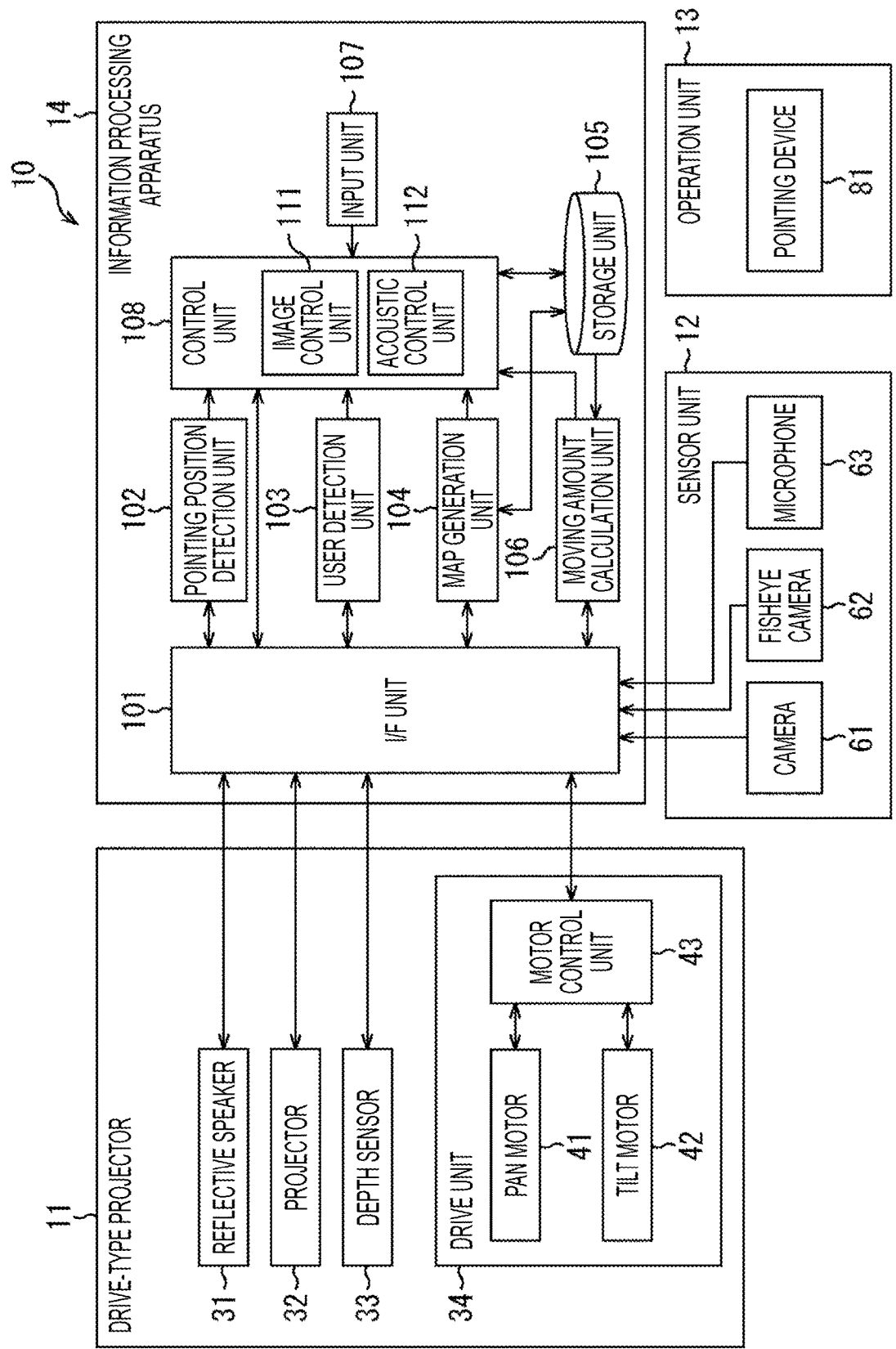
FIG. 1 is a block diagram illustrating an embodiment of an AV system to which the present technology is applied.
Figure 2:
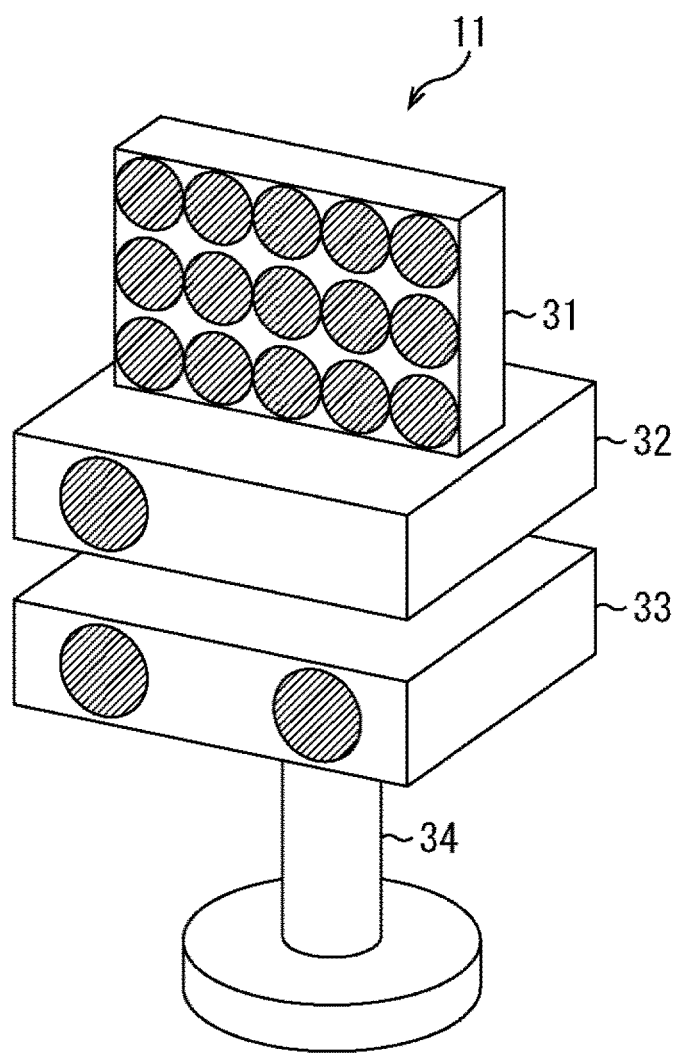
FIG. 2 is a schematic view illustrating a configuration example of an appearance of a drive-type projector of the AV system in FIG. 1.

First, a configuration example of an audio visual (AV) system 10 to which the present technology is applied will be described with reference to FIGS. 1 and 2. FIG. 1 is a block diagram illustrating a configuration example of functions of the AV system 10. FIG. 2 is a schematic view illustrating a configuration example of an appearance of a drive-type projector 11 of the AV system 10.

The AV system 10 is a system that projects an image in a predetermined space (hereinafter referred to as a display space) and outputs a sound accompanying the image. Further, the AV system 10 can freely change a display position of the image and a position of a virtual sound source in the display space, and is used for projection mapping or the like, for example.

The AV system 10 includes the drive-type projector 11, a sensor unit 12, an operation unit 13, and an information processing apparatus 14.

The drive-type projector 11 includes a reflective speaker 31, a projector 32, a depth sensor 33, and a drive unit 34. As illustrated in FIG. 2, in the drive-type projector 11, the depth sensor 33 is installed on the drive unit 34, the projector 32 is installed on the depth sensor 33, and the reflective sneaker 31 is installed on the projector 32.

The reflective speaker 31 is a speaker that generates a virtual sound source at a reflection position by outputting and reflecting an output sound at a desired position in the display space under control of the information processing apparatus 14. A user feels that a sound is being output from the position of the virtual sound source. The system of the reflective speaker 31 is not particularly limited as long as the reflective speaker 31 is a speaker capable of generating the virtual sound source at the reflection position. For example, the reflective speaker 31 is configured by a super directional speaker having sharp directivity.

Note that, as will be described below, in the case of creating a space map of the display space on the basis of a reflected sound with respect to the output sound of the reflective speaker 31, it is desirable to output an ultrasonic output sound from the reflective speaker 31. An example of such a speaker includes an ultrasonic speaker (parametric speaker) that outputs a signal obtained by modulating a carrier wave including ultrasonic waves by a predetermined method or the like.

Note that, hereinafter, in some cases, the reflective speaker 31 outputting the output sound toward the virtual sound source and reflecting the output sound at the virtual sound source is simply expressed as outputting a sound from the virtual sound source.

The projector 32 projects an image based on image data supplied from the information processing apparatus 14 onto a wall, an object, or the like in the display space under the control of the information processing apparatus 14. Note that the method of the projector 32 is not limited to a specific method, and any method can be adopted.

The depth sensor 33 captures a distance image indicating a distance from the drive-type projector 11 (more accurately, the depth sensor 33) at each position in the display space, using infrared light, for example, and supplies the captured distance image to the information processing apparatus 14 under the control of the information processing apparatus 14. Note that, as the method of the depth sensor 33, any method such as a time of flight (TOP) method, a pattern irradiation method, or a stereo camera method can be adopted.

The drive unit 34 controls an outputting direction of the reflective speaker 31, a projecting direction of the projector 32, and a capturing direction of the depth sensor 33 under the control of the information processing apparatus 14. The drive unit 34 includes a pan motor 41, a tilt motor 42, and a motor control unit 43.

The pan motor 41 is a motor that rotates the reflective speaker 31, the projector 32, and the depth sensor 33 in a pan direction (horizontal direction). The pan motor 41 includes an encoder and supplies, for example, detection results of a rotation speed and a rotation position of the pan motor 41 to the motor control unit 43.

The tilt motor 42 is a motor that rotates the reflective speaker 31, the projector 32, and the depth sensor 33 in a tilt direction (vertical direction). The tilt motor 42 includes an encoder and supplies, for example, detection results of a rotation speed and a rotation position of the tilt motor 42 to the motor control unit 4.

The motor control unit 43 controls rotation of the pan motor 41 and the tilt motor 42 under the control of the information processing apparatus 14. Further, the motor control unit 43 supplies control information of the drive unit 34 to the information processing apparatus 14. The control information of the drive unit 34 includes, for example, the rotation speeds and rotation positions of the pan motor 41 and the tilt motor 42.

Note that the drive unit 34 may be configured to be rotatable in a yaw direction (around a main axis in the projecting direction of an image) as well, for example. Further, the drive unit 34 may further include a moving mechanism such as a motor and a wheel.

The sensor unit 12 includes a camera 61, a fisheye camera 62, and a microphone 63.

The camera 61 captures an inside of the display space and supplies an image obtained as a result of capturing (hereinafter the image is referred to as a display space image) to the information processing apparatus 14. The display space image is used, for example, for detection of a position, a gaze direction, a gesture, and the like of the user in the display space.

The fisheye camera 62 is configured by a camera including a fisheye lens, and captures a super wide-angle image. The fisheye camera 62 supplies an image obtained as a result of capturing (hereinafter the image is referred to as a fisheye image) to the information processing apparatus 14. The fisheye image is used, for example, for detection of an irradiation position (pointing position) of infrared light emitted from a pointing device 81.

The microphone 63 is used, for example, for detection of the reflected sound with respect to the output sound from the reflective speaker 31. The microphone 63 supplies an audio signal indicating the detected sound to the information processing apparatus 14.

The operation unit 13 includes the pointing device 81.

The pointing device 81 is an operation device for the user to indicate a desired position. For example, the pointing device 81 irradiates a position with infrared light and indicates the position (pointing position) with infrared light according to a user's operation.

Note that the pointing device 81 may be configured by a dedicated device or by a general-purpose device usable for other uses, such as a smartphone or a remote controller.

The information processing apparatus 14 is configured, for example, by a computer, or a processor such as a CPU, a memory, and the like. The information processing apparatus 14 is mainly used for control of the drive-type projector 11.

The information processing apparatus 14 includes an interface (I/F) unit 101, a pointing position detection unit 102, a user detection unit 103, a map generation unit 104, a storage unit 105, a moving amount calculation unit 106, an input unit 107, and a control unit 108.

The I/F unit 101 is configured, for example, by a communication device, a connector, and the like. The I/F unit 101 transmits and receives data and the like to and from the reflective speaker 31, the projector 32, the depth sensor 33, the motor control unit 43, the camera 61, the fisheye camera 62, and the microphone 63. In addition, the I/F unit 101 supplies the received data and the like to each unit of the information processing apparatus 14, and acquires data or the like to be transmitted from each unit of the information processing apparatus 14.

Note that, as a communication method of the I/F unit 101, any wired or wireless method can be adopted. Further, the communication method of the I/F unit 101 may be changed for each target with which communication is performed. Further, for example, the I/F unit 101 may directly perform communication with each communication target or may perform communication via a network or the like.

The pointing position detection unit 102 detects the pointing position by the pointing device 81 on the basis of the fisheye image captured by the fisheye camera 62. The pointing position detection unit 102 supplies a detection result to the control unit 108.

Note that any method can be adopted as the detection method of the pointing position detection unit 102.

The user detection unit 103 detects, for example, the position, the gaze direction, the gesture, and the like of the user in the display space on the basis of the display space image captured by the camera 61. The user detection unit 103 supplies a detection result to the control unit 108.

Note that any method can be adopted as the detection method of the user detection unit 103.

The map generation unit 104 controls the depth sensor 33 and the motor control unit 43 via the I/F unit 101 to control capturing of the distance image in the display space by the depth sensor 33. Then, the map generation unit 104 performs space recognition of the inside of the display space using the distance image, and generates a first space map indicating a three-dimensional shape of an object, a wall, and the like in the display space. The first space map includes, for example, a three-dimensional point group map and includes the depth information indicating the distance from the drive-type projector 11 at each position in the display space.

Further, the map generation unit 104 controls the reflective speaker 31 and the motor control unit 43 via the I/F unit 101 to control scanning of the output sound from the reflective speaker 31 in the display space. Then, the map generation unit 104 performs space recognition of the inside of the display space on the basis of a detection result of the reflected sound detected by the microphone 63 when the output sound is scanned in the display space, and generates a second space map indicating a three-dimensional shape of an object, a wall, and the like in the display space. The second space map includes, for example, a three-dimensional point group map, and includes the depth information indicating the distance from the drive-type projector 11 at each position in the display space, and reflection characteristic information indicating a reflection characteristic of each position (for example, reflectance, an reflection angle, and the like).

Further, the map generation unit 104 generates an integrated space map obtained by integrating the first space map and the second space map. The integrated space map includes, for example, the depth information indicating the distance from the drive-type projector 11 at each position in the display space, the reflection characteristic information indicating a reflection characteristic of each position, and display characteristic information indicating availability of display of an image (availability of projection of the image) at each position in the display space. Further, the integrated space map includes, for example, image position information indicating a display position of an image set in advance to the display space. The map generation unit 104 causes the storage unit 105 to store the generated integrated space map.

Further, the map generation unit 104 detects the position of the microphone 63 and the like on the basis of the first space map, for example. The map generation unit 104 supplies a detection result to the control unit 108.

Note that, for example, the position of the microphone 63 and the like may be detected on the basis of the display space image captured by the camera 61.

The moving amount calculation unit 106 calculates or predicts a moving direction and a moving amount of the projection area of the projector 32 on the basis of the control information of the drive unit 34. The moving amount calculation unit 106 supplies a calculation result or a prediction result of the moving direction and the moving amount of the projection area to the control unit 108.

Note that, for example, the moving amount calculation unit 106 can predict the moving direction and the moving amount of the projection area on the basis of a moving speed or an acceleration of the projection area. Further, for example, the moving amount calculation unit 106 can predict the moving direction and the moving amount of the projection area on the basis of a moving (angular) speed or an (angular) acceleration of the projecting direction of the projector 32.

The input unit 107 includes, for example, an operation device and the like, and is used for input of commands, and data (for example, image data and audio data) to the control unit 108, and the like.

The control unit 108 includes an image control unit 111 and an acoustic control unit 112.

The image control unit 111 controls display of an image by the drive-type projector 11. For example, the image control unit 111 controls the projector 32 via the I/F unit 101 to control content and display timing of the image to be displayed, and the like. Further, the image control unit 111 controls, for example, a display image range on the basis of the calculation result or the prediction result of the moving direction and the moving amount of the projection area of the projector 32. Here, the display image range is a range of contents to be displayed within the projection area, among contents set to be displayed in the display space.

Further, for example, the image control unit 111 controls the motor control unit 43 via the I/F unit 101 to control the projecting direction of the image of the projector 32 and the outputting direction of the reflective speaker 31, thereby to control the display position of the image and the reflection position of the output sound (that is, the position of the virtual sound source).

The acoustic control unit 112 controls the output of the output sound of the reflective speaker 31. For example, the acoustic control unit 112 controls the reflective speaker 31 via the I/F unit 101 to control content, a volume, output timing, and the like of the output sound.

Note that, hereinafter, description of the I/F unit 101 is appropriately omitted for easy understanding of description. For example, in the case where the image control unit 111 supplies the image data to the projector 32 via the I/F unit 101, it is merely described that the image control unit 111 supplies the image data to the projector 32.

Processing of AV System 10

Next, processing of the AV system 10 will be described with reference to FIGS. 3 to 10.

Space Map Generation Processing

Figure 3:
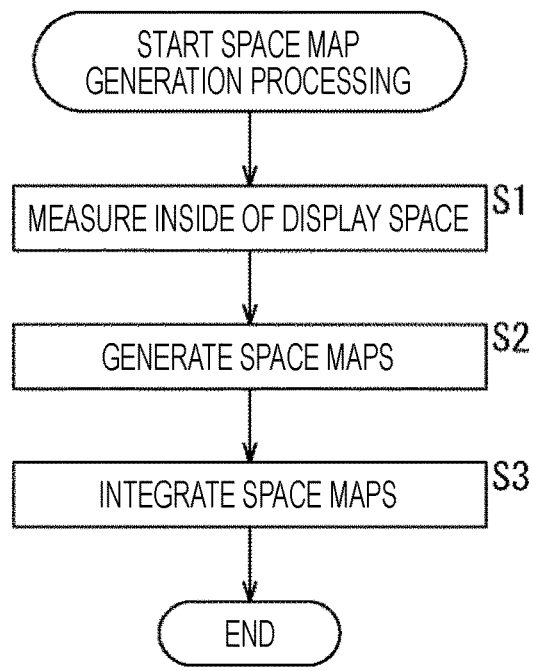
FIG. 3 is a flowchart for describing space map generation processing executed by the AV system in FIG. 1.

First, space map generation processing executed by the AV system 10 will be described with reference to the flowchart in FIG. 3.

Note that this processing is started, for example, when the drive-type projector 11 is installed or when the installation position of the drive-type projector 11 is moved. Movement of the installation position of the drive-type projector 11 can be detected on the basis of the display space image captured by the camera 61 or by providing an acceleration sensor, a gyro sensor, or the like in the drive-type projector 11, for example.

In addition, for example, when the state of the display space is changed on the basis of the display space image captured by the camera 61, the space map generation processing may be started. As the change of the state of the display space, for example, movement of a movable part in the display space (for example, opening or closing of a door, a window, a curtain, or the like) entering or exiting of a person into or from the display space, or the like is assumed.

In step S1, the AV system 10 measures the inside of the display space. To be specific, the map generation unit 104 controls the motor control unit 43 to rotate the drive unit 34 in the pan direction and the tilt direction, and causes the depth sensor 33 to scan all of areas in the display space and to scan the output sound (ultrasonic signal) output from the reflective speaker 31 in all of areas in the display space.

With the scanning, all the areas in the display space are captured by the depth sensor 33, and the distance image indicating the distance of each area from the depth sensor 33 is obtained. The depth sensor 33 supplies the captured distance image to the map generation unit 104. Further, the reflected sounds with respect to the output sounds from all the areas in the display space are detected by the microphone 63. The microphone 63 supplies the audio signals indicating the detection results to the map generation unit 104.

In step S2, the map generation unit 104 generates the space map. To be specific, the map generation unit 104 generates the first space map on the basis of the distance image captured by the depth sensor 33. The first space map includes the depth information indicating the distance from the drive-type projector 11 at each position in the display space.

Note that, since the depth sensor 33 uses reflection of infrared light, depth information of an area where reflection of infrared light cannot be used, such as a black wall, concrete, glass, or the like, is lacked in the first space map.

Further, the map generation unit 104 detects the positions of the microphone 63 and the like in the display space on the basis of the first space map. The map generation unit 104 supplies a detection result to the control unit 108.

Further, the map generation unit 104 generates the second space map on the basis of the audio signal from the microphone 63. To be specific, the map generation unit 104 calculates the distances from the reflective speaker 31 and the microphone 63 to each position in the display space on the basis of the outputting direction of the output sound, the positions of the reflective speaker 31 and the microphone 63, and a time from when the output sound is output to when the reflected sound is received.

Figure 4:
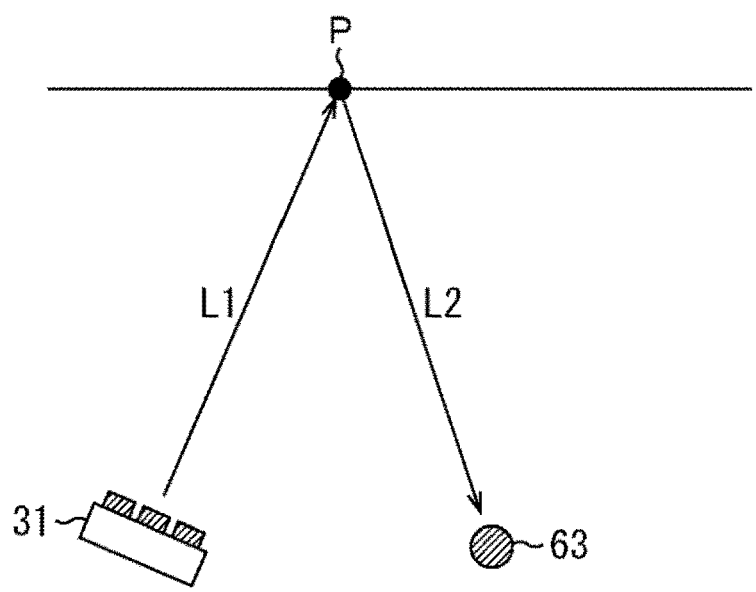
FIG. 4 is a diagram for describing a method of calculating a reflectance.

Further, the map generation unit 104 calculates the reflectance of each position in the display space on the basis of the volume of the reflected sound. For example, a case in which the output sound output from the reflective speaker 31 is reflected at a reflection position P, and the reflected sound of the output sound is detected by the microphone 63, as illustrated in FIG. 4, will be described. Note that, hereinafter, the distance between the reflective speaker 31 and the reflection position P is L1, and the distance between the reflection positron P and the microphone 63 is 12.

Here, in the case of assuming that all the output sound is reflected in the direction of the microphone 63 without being attenuated (in the case of assuming that the reflectance is 100%) at the reflection position P, an attenuation amount of the reflected sound detected by the microphone 63 with respect to the output sound can be estimated on the basis of the distance L1+the distance L2. Hereinafter, the attenuation amount in this case is referred to as a reference attenuation amount.

Meanwhile, in reality, the output sound is diffused or absorbed at the reflection position P, and thus the volume of the reflected sound reflected in the direction of the microphone 63 is small. Therefore, the map generation unit 104 estimates the reflectance of the reflection position P according to a ratio of the attenuation amount of the reflected sound actually detected by the microphone 63 with respect to the output sound, and the reference attenuation amount.

Then, the map generation unit 104 generates the second space map including the depth information indicating the distance from the drive-type projector 11 at each position in the display space, and the reflection characteristic information indicating the reflectance at each position in the display space.

Note that the depth information of the area can be obtained in an area where reflection of the output sound (ultrasonic signal) can be used, even if the area lacks the depth information in the first space map because reflection of infrared light cannot be used.

In step S3, the map generation unit 104 integrates the space maps. To be specific, the map generation unit 104 compensates the depth information of the area where the depth information is lacked in the first space map by the depth information of the second space map.

Further, the map generation unit 104 generates the display characteristic information indicating whether an image is displayable at each position in the display space. For example, the map generation unit 104 determines that a position where the depth information is obtained in the first space map is a position where an image is displayable. Meanwhile, the map generation unit 104 estimates hardness and surface material of the position where the depth information is lacked in the first space map on the basis of the reflection characteristic information of the second space map. Then, the map generation unit 104 determines whether an image is displayable at the position where the depth information is lacked in the first space map on the basis of the estimated hardness and surface material. With the determination, for example, a position where protection of an image is difficult, such as a black wall, concrete, or glass, is determined as a position where display of the image is difficult.

Note that the map generation unit 104 may determine all the positions where the depth information is lacked in the first space map as the positions where display of an in is difficult.

Further, the map generation unit 104 uses the reflection characteristic information of each position in the display space, of the second space map, as reflection characteristic information of the integrated space map without change.

In this way, the map generation unit 104 generates the integrated space map including the depth information, the display characteristic information, and the reflection characteristic information of each position in the display space.

Further, the map generation unit 104 adds, for example, the image position information indicating a display position of an image set in advance to the display space to the integrated space map. In the image position information, for example, content of the image set to be displayed at each position in the display space is indicated. Note that, in the case where the image displayed in the display space is a moving image, for example, content of the image set to be displayed at each position is indicated in the image position information in chronological order.

The map generation unit 104 causes the storage unit 105 to store the generated integrated space map.

After that, the space map generation processing is terminated.

Note that, for example, information indicating that the space map is being generated may be output with an image, a sound, or the like from the drive-type projector 11 during generation of the space map.

Display Control Processing

Next, display control processing executed by the AV system 10 will be described with reference to the flowchart in FIG. 5. This processing is started when the user gives a command of movement of the projection area of the projector 32 to the AV system 10 by the pointing device 81, the input unit 107 of the information processing apparatus 14, or an arbitrary method such as a gesture or a gaze, for example.

Figure 6:
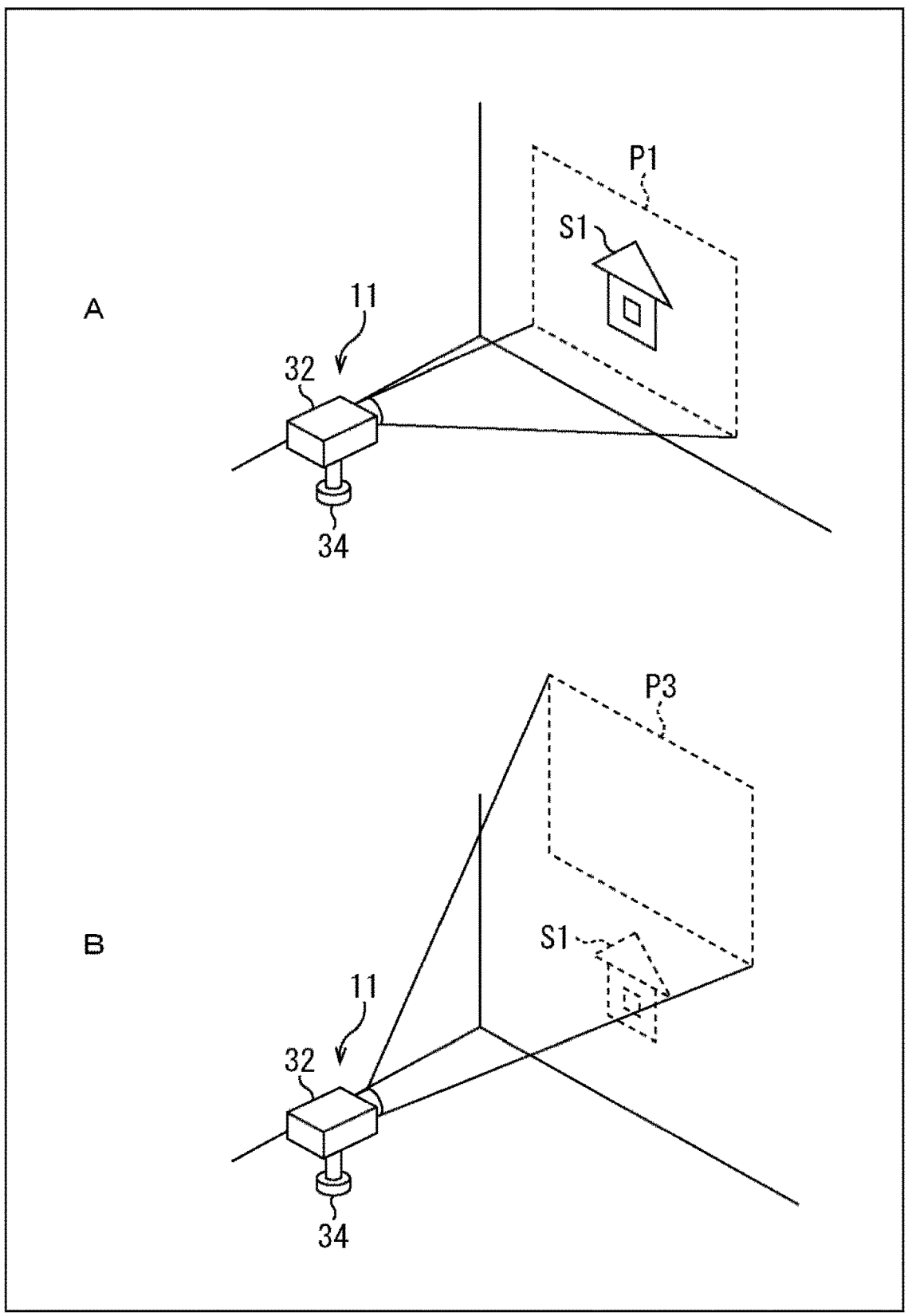
FIG. 6 is a view for describing a specific example of the first embodiment of the display control processing.

Note that, hereinafter, as illustrated in FIG. 6, a case in which a destination (target position) of the projection area of the projector 32 is set to an area P3, and the area P3 is moved upward from an area P1 will be appropriately described as a specific example.

For example, in the projection area P1 of A in FIG. 6, an object S1 that is a house is displayed. Further, the display position of the object S1 in the display space is fixed, and even if the projection area of the projector 32 is moved from the area P1 to the area P3, the position of the object S1 in the display space remains fixed and is not moved. In this example, since the object S1 is outside the projection area P3, the object S1 becomes non-displayed in the case where the projection area is moved to the area P3.

Note that, in FIG. 6, illustration of the reflective speaker 31 and the depth sensor 33 of the drive-type projector 11 is omitted to simplify the drawing.

In step S51, the image control unit 111 starts driving of the projector 32. To be specific, the image control unit 111 controls the motor control unit 43 to start, rotation of at least one of the pan motor 41 and the tilt motor 42 according to the direction in which the projection area is moved.

In step S52, the moving amount calculation unit 106 calculates the moving direction and the moving amount of the projection area. For example, the moving amount calculation unit 106 acquires the control information of the drive unit 34 from the motor control unit 43. As described above, the control information of the drive unit 34 includes the rotation speeds and rotation positions of the pan motor 41 and the tilt motor 42. Then, for example, the moving amount calculation unit 106 detects rotating directions and rotation angles in the pan direction and the tilt direction, of the projector 32 after an image of a previous frame is projected, on the basis of the rotation speeds and the rotation positions of the pan motor 41 and the tilt motor 42.

Further, the moving amount calculation unit 106 detects the moving direction of the projection area on the basis of the rotating directions of the projector 32 in the pan direction and the tilt direction. Further, the moving amount calculation unit 106 obtains the distance between the projector 32 and the projection area on the basis of the depth information of the integrated space map. Then, the moving amount calculation unit 106 calculates the moving amounts of the projection area in the pan direction and the tilt direction on the basis of the rotation angles of the projector 32 in the pan direction and the tilt direction, and the distance between the projector 32 and the projection area. The moving amount calculation unit 106 supplies the calculation result of the moving direction and the moving amounts of the projection area to the control unit 108.

Figure 7:
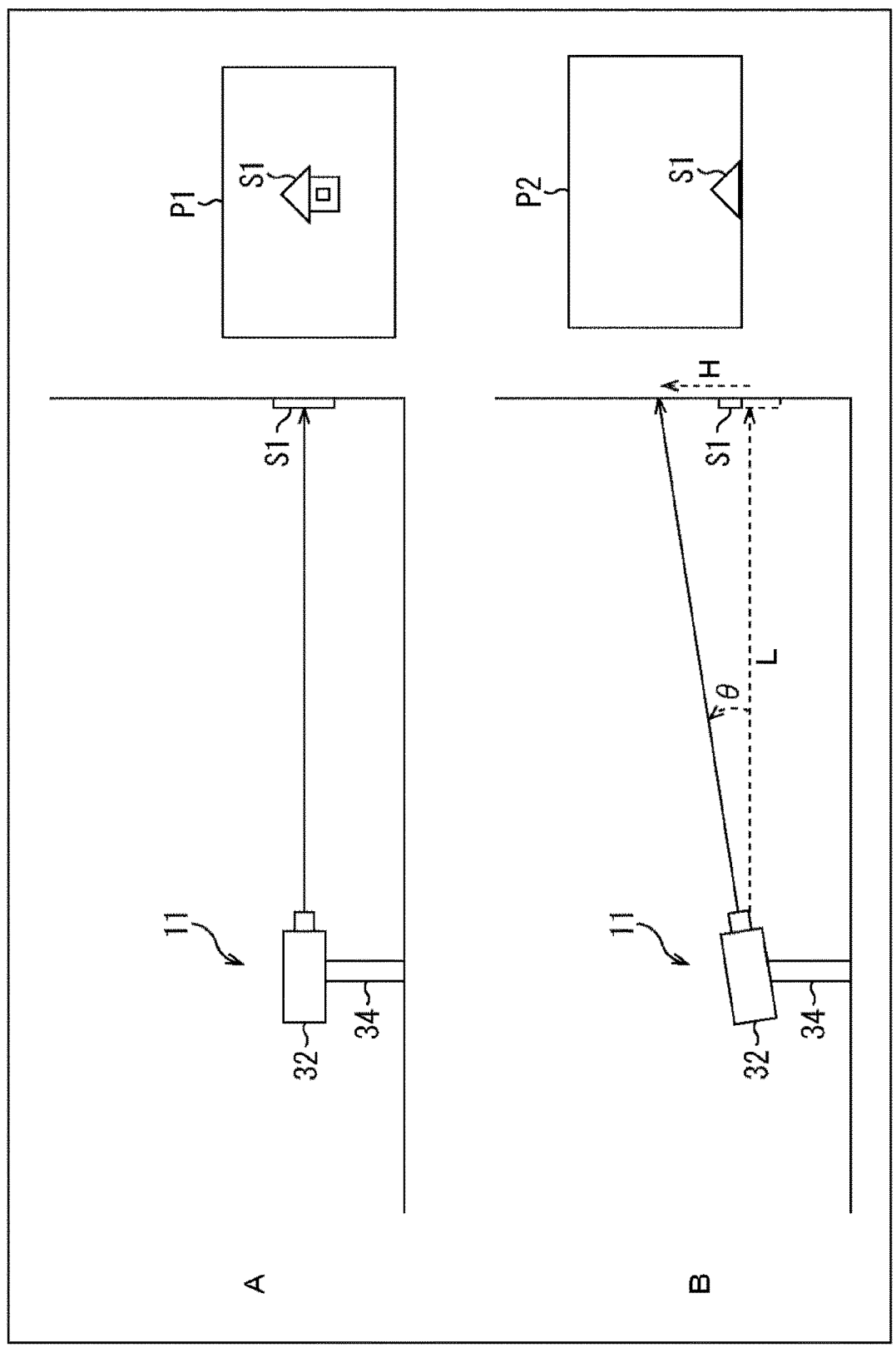
FIG. 7 is a view for describing an example of a method of calculating a moving amount of a projection area.

Here, as illustrated in FIG. 7, a method of calculating the moving amount of the projection area in the case where the projection area is moved from the area P1 to an area P2 between the area P1 and the area P3 (FIG. 6) will be described as an example.

Note that, in FIG. 7, illustration of the reflective speaker 31 and the depth sensor 33 of the drive-type projector 11 is omitted to simplify the drawing, similarly to FIG. 6

The moving amount calculation unit 106 detects a rotation angle θ of the projector 32 on the basis of the rotation speed and the rotation position of the tilt motor 42. Further, the moving amount calculation unit 106 obtains a distance L between the projector 32 and the projection area P1 on the basis of the depth information of the integrated space map.

Then, the moving amount calculation unit 106 calculates a moving amount H between the projection area P1 and the projection area P2 by the following expression (1), for example.

$$H = L \times \tan\theta \quad (1)$$

Note that, in this example, the projection area P1 is at substantially the same height as the projector 32, and the projecting direction of the projector 32 with respect to the projection area P1 is substantially horizontal. Therefore, the moving amount H can be calculated by the following expression (1). Meanwhile, the moving amount H is sometimes calculated by an expression different from the expression (1), depending on the height of the projection area P1.

Further, the processing of detecting the distance L by the depth sensor 33 and the like can be omitted by using the integrated space map, and thus the moving amount calculation unit 106 can more promptly calculate the moving amount H.

Note that, in the case where the projector 32 is moved not only in the rotating direction but also in a translation direction, the moving amount calculation unit 106 calculates the moving direction and the moving amount of the projection area in consideration of the movement in the translation direction.

In step S53, the image control unit 111 sets the display image range. For example, the image control unit 111 sets the display image range that is the range of the image to be displayed in the projection area after the projection area is moved by the calculated moving direction and moving amount on the basis of the image position information of the integrated space map. This display image range is a range moved from the display image range of a previous frame by the same amount as the calculated moving amount of the projection area in the same direction as the calculated moving direction of the projection area.

For example, in the above-described example of FIG. 7, the image control unit 111 sets the display image range corresponding to the projection area P2. The display image range corresponding to the projection area P2 is a range moved upward by the distance H from the display image range corresponding to the projection area P1.

In step S54, the AV system 10 displays an image. To be specific, the image control unit 111 supplies image data corresponding to the image in the display image range set in the processing in step S53 to the projector 32. The projector 32 projects the image based on the image data supplied from the image control unit 111.

For example, in the above-described example of FIG. 7, the display image range is moved upward by the distance H. With the movement, the position of the object S1 in the projection area P2 is moved downward by the distance H from the position of the object S1 in the projection area P1 in a direction opposite to the moving direction of the display image range.

In step S55, the image control unit 111 determines whether the movement of the projection area has been completed. In the case where the projection area has not reached the target position set as the destination, the image control unit 111 determines that the movement of the projection area has not been completed, and the processing is returned to step S52.

After that, the processing of steps S52 to S55 is repeatedly executed until completion of the movement of the projection area is determined in step S55.

On the other hand, in step S55, in the case where the projection area has reached the target position, the image control unit 111 determines that the movement of the projection area has been completed, and the processing proceeds to step S56.

In step S56, the image control unit 111 stops driving the projector 32. To be specific, the image control unit 111 controls the motor control unit 43 to stop the rotation of the pan motor 41 and the tilt motor 42.

After that, the display control processing is terminated.

In this way, the display image range is moved following the movement of the projection area, and the determined image is displayed at the determined place in the display space.

For example, a time is required from when the image control unit 111 starts driving of the pan motor 41 and the tilt motor 42 via the motor control unit 43 to when the pan motor 41 and the tilt motor 42 actually start rotation. Further, a time is required from when the pan motor 41 and the tilt motor 12 start rotation to when the rotation speeds become stable and become a constant speed. Therefore, the projection area of the projector 32 requires a time to start the movement, and further requires a time until the moving speed of the projection area becomes stable and becomes a constant speed.

Figure 8:
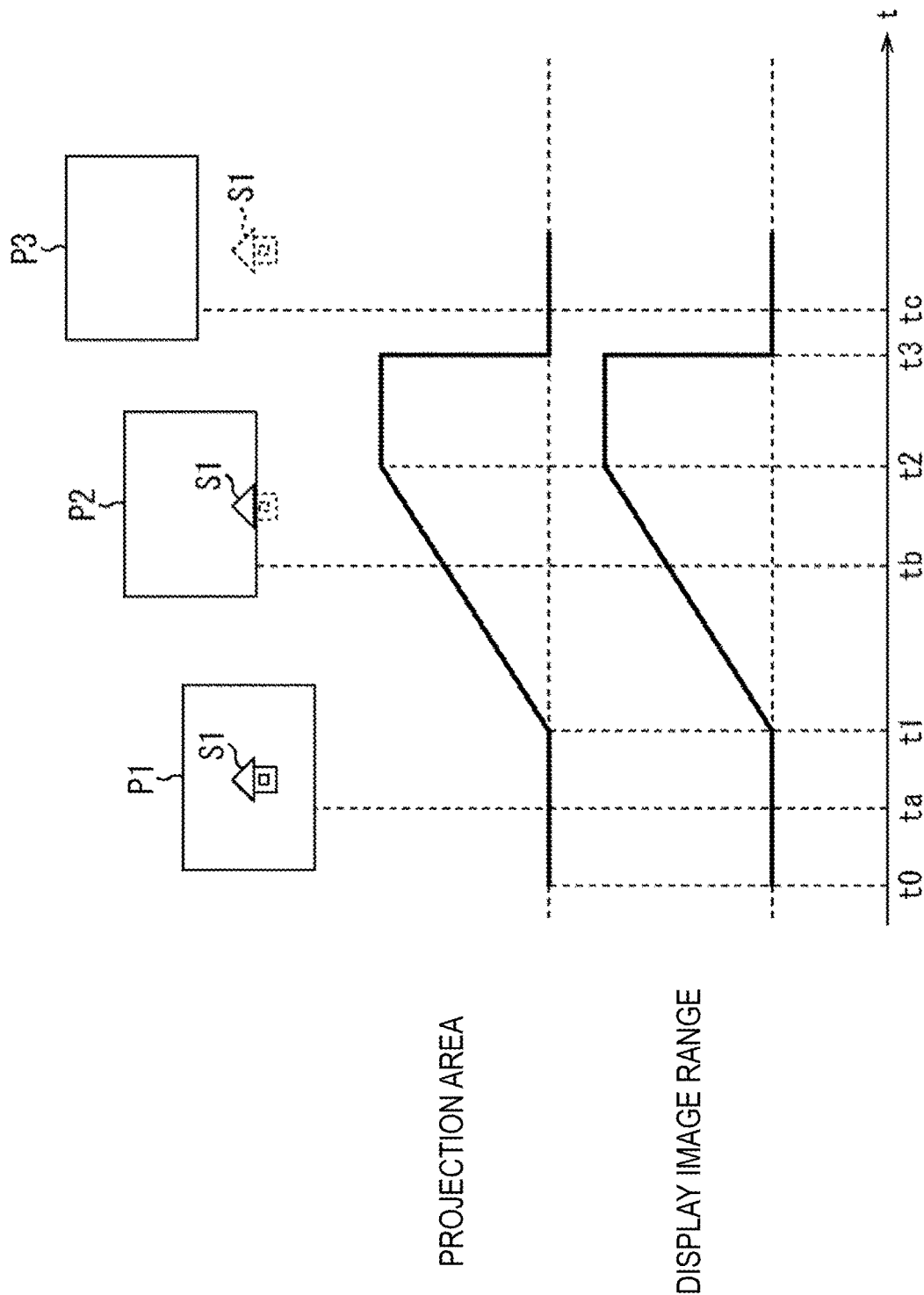
FIG. 8 is a diagram illustrating a relationship between the projection area and a display image range.

FIG. 8 is a diagram illustrating a relationship between the projection area and the display image range of a case where the projection area of the projector 32 is moved, as illustrated in FIGS. 6 and 7. In the upper part in FIG. 8, the projection areas and the images displayed in the projection areas are schematically illustrated. In the lower part in FIG. 8, graphs illustrating the moving speeds of the projection area and the display image range are displayed. Note that the horizontal axis of the graph represents the time and the vertical axis represents the moving speed.

For example, at a time t0, after the image control unit 111 starts driving of the tilt motor 42 via the motor control unit 43, the tilt motor 42 starts rotation at a time t1, and the movement of the projection area is started. After that, the rotation speed of the tilt motor 42 is gradually accelerated, and at a time t2, the rotation speed becomes stable and becomes a constant speed. Then, at a time t3, when the projection area has reached the area P3 that is the target position, the image control unit 111 stops the rotation of the tilt motor 42 via the motor control unit 43.

For example, in the case of projecting the image of a new frame at a time to between the time t0 and the time t1, the projection area is unmoved, and thus the object S1 is kept displayed at the same position in the projection area P1, similarly to the example of A in FIG. 6.

Next, in the case of projecting the image of a next frame at a time tb between the time t1 and the time t2, the projection area is moved from the area P1 to the area P2 of B in FIG. 7. In accordance with the movement, the image control unit 111 moves the display image range by the same amount as the moving amount of the projection area between the time ta and the time tb in the same direction as the moving direction of the projection area. With the movement, in the projection area, the object S1 is moved by the same amount as the moving amount of the projection area in an opposite direction to the moving direction of the projection area. As a result, the display position of the object S1 is not moved while being localized at a predetermined position within the display area regardless of the movement of the projection area.

Next, in the case of projecting the image of a next frame at a time tc after the time t3, the projection area is moved from the area P2 to the area P3 of B in FIG. 6. In accordance with the movement, the image control unit 111 moves the display image range by the same amount as the moving amount of the projection area between the tame tb and the time to in the same direction as the moving direction of the projection area. With the movement, the object S1 is moved by the same amount as the moving amount of the projection area in an opposite direction to the moving direction of the projection area, but the object S1 is moved outside the projection area P3 and becomes non-displayed.

In this way, the moving directions and the moving amounts of the projection area in the pan direction and the tilt direction associated with the rotation of the projector 32 in the pan direction and the tilt direction are promptly calculated, and the display image range is promptly moved in accordance with the movement of the projection area. With the movement, even if operation of the pan motor 41 and the tilt motor 42 becomes unstable at the start of driving, the image is localized at a predetermined position, and occurrence of shift and shake, and the like of the image is suppressed. That is, the position of the image projected by the projector 32 is stabilized.

Note that, in the above description, an example in which the image control unit 111 calculates the moving direction and the moving amount of the projection area on the basis of the control information of the drive unit 34 and moves the display image range on the basis of the calculated moving direction and moving amount has been described. That is, an example of moving the display image range, following the movement, of the projection area by the rotation of the projector 32 in the pan direction and the tilt direction, has been described.

Meanwhile, for example, characteristics are grasped in advance in the drive unit 34, and the moving direction and the moving amount of the projection area can be predicted on the basis of the control information and the characteristics of the drive unit 34. Here, examples of the characteristics of the drive unit 34 include response characteristics, rotation characteristics, and the like of the pan motor 41 and the tilt motor 42.

Figure 5:
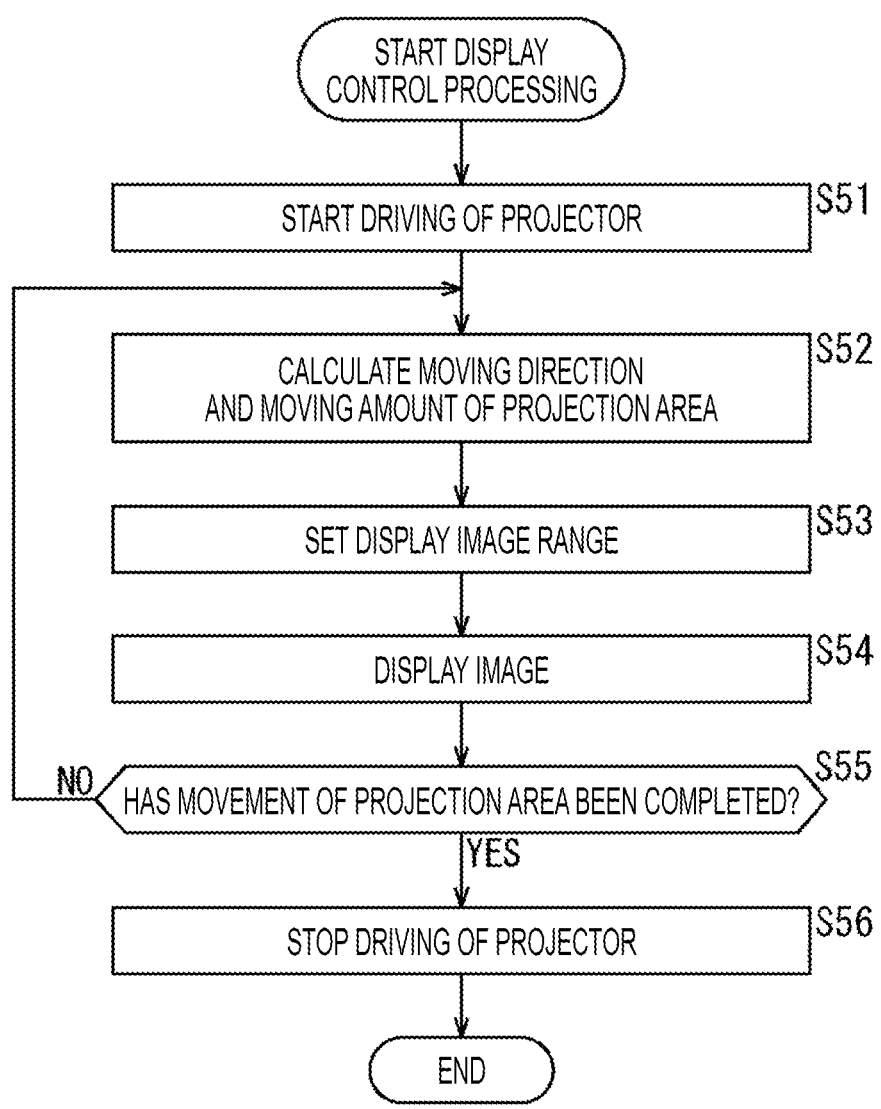
FIG. 5 is a flowchart for describing a first embodiment of display control processing executed by the AV system in FIG. 1.

For example, in step S52 in FIG. 5, the image control unit 111 predicts the moving direction and the moving amount of the projection area on the basis of the control information and the characteristics of the drive unit 34. Then, the image control unit 111 may set the display image range on the basis of prediction values of the moving direction and the moving amount of the projection area.

With the setting, the display image range can be moved substantially at the same time with the movement of the projection area, and a delay of the movement of the display image range with respect to the movement of the projection area becomes substantially 0. Therefore, occurrence of shift, and shake, and the like of the image can be further suppressed. That is, the position of the image projected by the projector 32 can be further stabilized.

Note that, at this time, for example, by detecting the actual projecting direction of the projector 32, feeding back the detection result, and correcting the position of the projection area, the position of the image projected by the projector 32 can be further stabilized.

Further, for example, the projector 32 may be a single-plate digital light processing (DIP) projector, and the projector 32 sometimes projects images an red (R), green (G), and blue (B) at different times in a time division manner with respect to one image that configures the image of contents. Then, the user recognizes an image in one color by visually recognizing images in the colors projected at different times. Here, one image is, for example, a still image, a single frame image of a moving image, or the like.

In this case, when the projection area and the display image area are moved by the above-described method, color breaking may occur. Here, the color breaking is, for example, a phenomenon in which color shift and the like occur when images in different colors corresponding to the same one image are projected on different positions.

Figure 9:
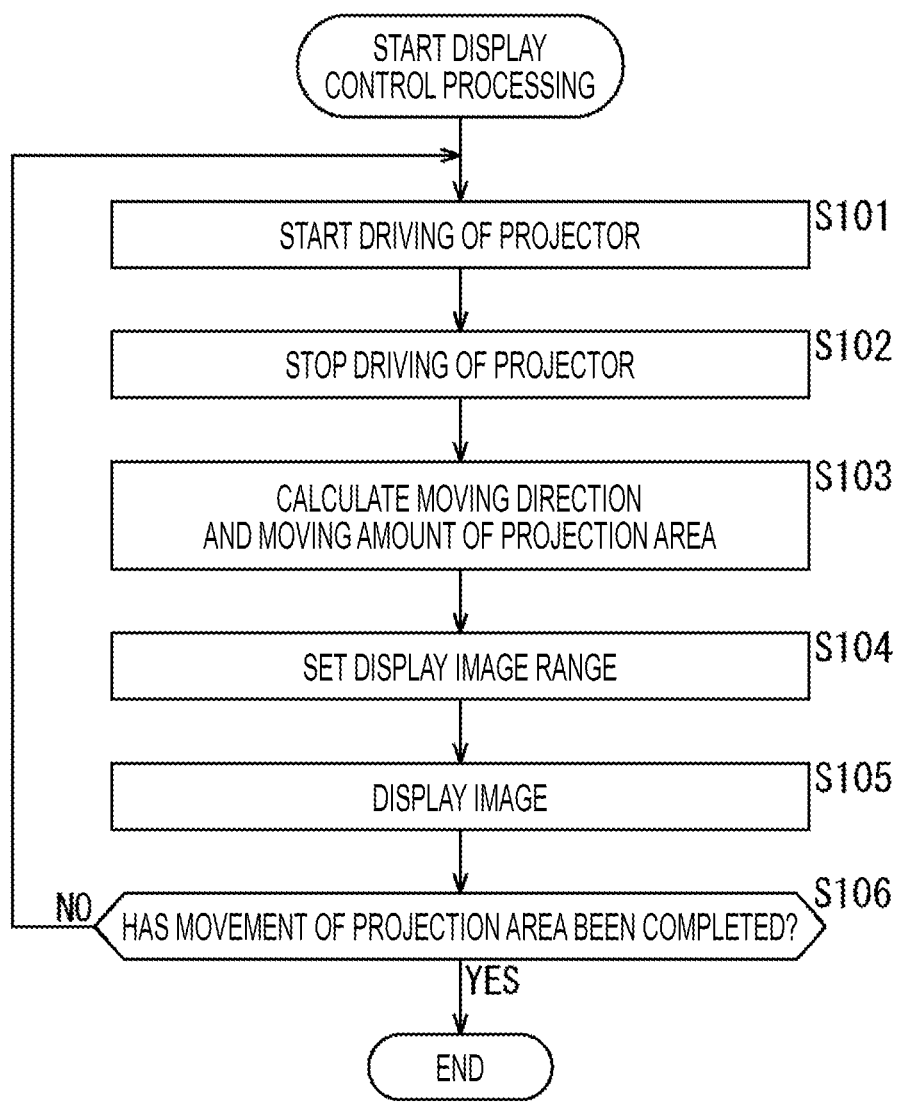
FIG. 9 is a flowchart for describing display control processing for realizing a first method for countermeasures against color breaking executed by the AV system in FIG. 1.

Here, display control processing for realizing a first method for countermeasures against color breaking will be described with reference to the flowchart in FIG. 9.

In step S101, the driving of the projector 32 is started, similarly to the processing in step S51 in FIG. 5.

In step S102, the driving of the projector 32 is stopped, similarly to the processing in step S56 in FIG. 5.

In step S103, the moving direction and the moving amount of the projection area are calculated, similarly to the processing in step S52 in FIG. 5.

In step S104, the display image range is set, similarly to the processing in step S53 in FIG. 5.

In step S105, the AV system 10 displays an image. To be specific, the image control unit 111 supplies image data corresponding to the image in the display image range set in the processing in step S104 to the projector 32. The projector 32 projects the image based on the image data supplied from the image control unit 111.

Figure 10:
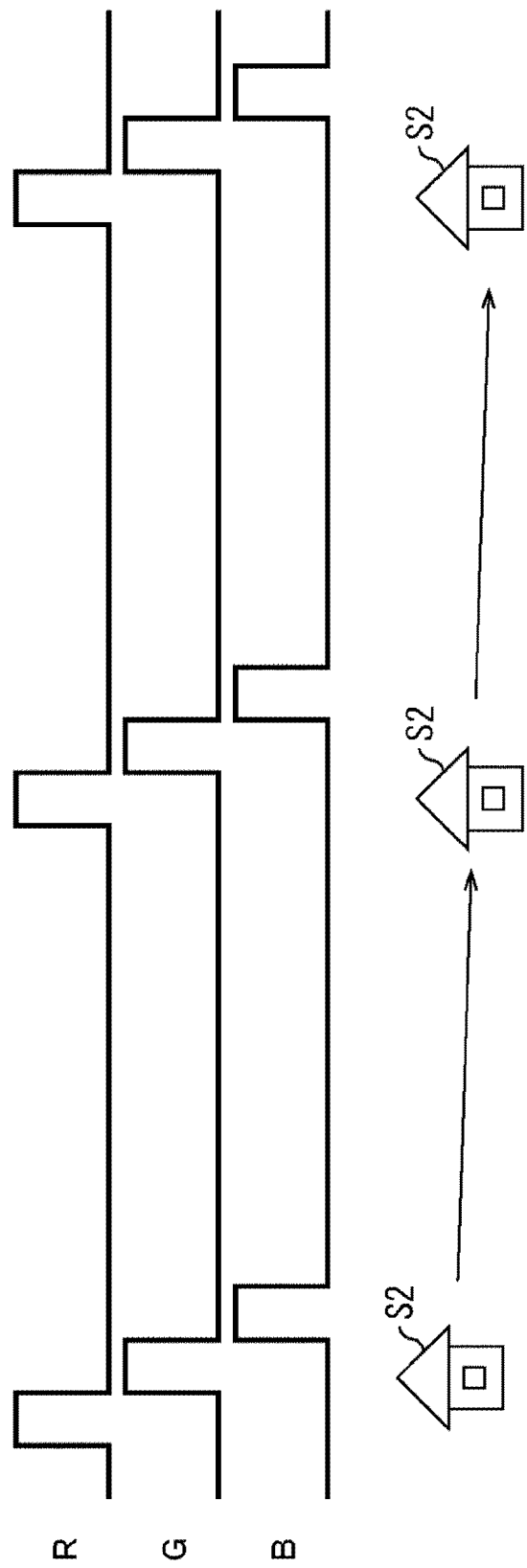
FIG. 10 is a diagram for describing the first method for the countermeasures against color breaking.

At this time, for example, as illustrated in FIG. 10, the projector 32 projects the images in the R, G, and B colors corresponding to the image in the display image range into the projection area at different times in a time division manner.

Note that the horizontal axis on the graph in FIG. 10 represents the time, and indicates timing to project the images in the R, G, and B colors.

Here, in step S102, the driving of the projector 32 is stopped, and the movement of the projection area is stopped. Therefore, for example, the R, G, B images for the object S2 in FIG. 10 are projected onto the same position in the display space. With the projection, occurrence of the color breaking is suppressed, the display position of the object S2 is stabilized, and the color of the object is faithfully reproduced.

In step S106, whether the movement of the projection area has been completed is determined, similarly to the processing in step S55 in FIG. 5. In the case where incompletion of the movement of the projection area is determined, the processing is returned to step S101.

After that, the processing of steps S101 to S106 is repeatedly executed until completion of the movement of the projection area is determined in step S106.

On the other hand, in step S106, in the case where completion of the movement of the projection area is determined, the display control processing is terminated.

As described above, the driving of the projector 32 is temporarily stopped and the movement of the projection area is stopped until projection of the images in all the colors corresponding to one image is completed in moving the projection area. To be specific, the driving of the projector 32 is temporarily stopped before projection of the one image is started, and the movement, of the projection area is temporarily stopped in moving the projection area. After that, after the projection of the images in all the colors corresponding to the one image is completed, the driving of the projector 32 is resumed, and the movement of the projection area is resumed. With the processing, as described above, the occurrence of the color breaking is suppressed, the display position of the image is stabilized, and the color of the image is faithfully reproduced.

Further, for example, the occurrence of the color breaking may be suppressed by controlling positions in the projection area, of the images in the R, G, and B colors projected by the projector 32.

Figure 11:
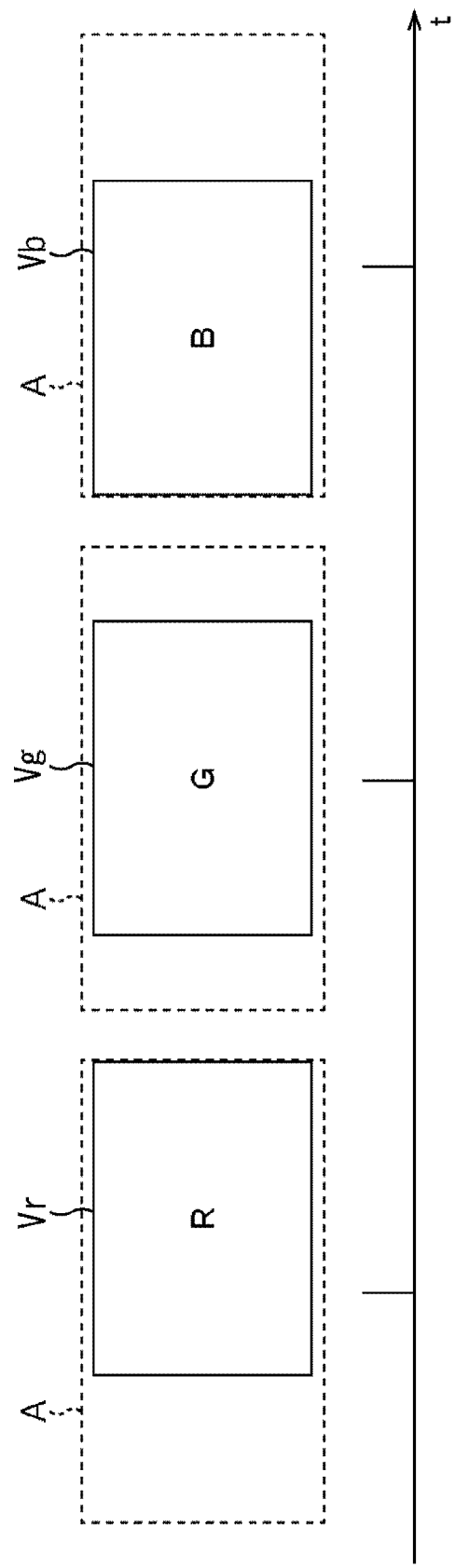
FIG. 11 is a diagram for describing a second method for the countermeasures against color breaking.

Here, a second method for countermeasures against color breaking will be described with reference to FIG. 11. Note that FIG. 11 illustrates a positional relationship between displayable ranges A of the projector 32, and an image Vr of R, an image Vg of G, and an image Vb of B. The displayable range A is a range in which an image can be displayed by the projector 32, and is equal to the projection area of the projector 32. The projector 32 can display an image of an arbitrary size at an arbitrary position within the displayable range A. Therefore, in the case of displaying an image having a size smaller than the displayable range A, the image control unit 111 can control the position of the image in the displayable range A by the image data supplied to the projector 32. With the control, the image control unit 111 can move the position of the image within the displayable range A (projection area) while fixing the projecting direction of the projector 32, for example. Meanwhile, in the case of displaying an image having the same size as the displayable range A, the position of the image is uniquely determined.

Then, the image control unit 111 prevents shift of the positions of the image Vr, the image Vg, and the image Vr associated with the movement of the projection area by controlling the positions of the image Vr, the image Vg, and the image Vr within the displayable range A. To be specific, the displayable range A (=the projection area) is moved with the movement of the projector 32 in the projecting direction. Therefore, the image control unit 111 moves the position of the image Vg with respect to the image Vr in a coordinate system of the displayable range A by a moving amount corresponding to the moving amount of the displayable range A in a direction of offsetting the movement of the displayable range A (projection area) during a time from when the image Vr is projected to when the image Vg is projected. Further, the image control unit 111 moves the position of the image Yb with respect to the image Vg in the coordinate system of the displayable range A by the moving amount corresponding to the moving amount of the displayable range A in a direction of offsetting the movement of the displayable range A (projection area) during a time from when the image Vg is projected to when the image Vb is projected.

Therefore, intervals between two of the images Vr, Vg, and Vb in the coordinate system of the displayable range A become longer as the moving speed of the projection area becomes faster, and the positions of the images Vr, Vg, and Vb as viewed from the projector 32 are separated. On the other hand, the intervals between two of the images Vr, Vg, and Vb in the coordinate system of the displayable range A become shorter as the moving speed of the projection area becomes slower, and the positions of the images Vr, Vg, and Vb as viewed from the projector 32 come close. Further, in the case where the projection area is stopped, the positions of the images Vr, Vg, and Vb within the displayable range A substantially coincide.

As a result, even if the projection area is moved, the images Vr, Vg, and Vb are projected onto substantially the same position in the display space, and occurrence of the color breaking is suppressed.

Note that the projector 32 can control the positions of the images in colors within the displayable range A, instead of the image control unit 111. For example, an image control unit (not illustrated) of the projector 32 can control the positions of the images in colors within the displayable range A according to positions in a frame buffer where the images in colors included in the image data supplied from the image control unit 111 are arranged.

Further, a control vector for shifting the images in colors within the displayable range A is calculated by a predetermined function on the basis of a vector based on the moving direction and the moving amount of the projection area, for example.

Note that the combination of the colors of the images to which the above-described countermeasures against color breaking can be applied is not limited to the above-described R, G, and B, and is arbitrary.

2. Modification

Hereinafter, modifications of the above-described embodiment of the present technology will be described.

Modification Regarding Configuration Example of System

The configuration example of the AV system 10 in FIG. 1 is an example, and can be changed as necessary.

For example, the reflective speaker 31 may be provided separately from the drive-type projector 11 so that the reflective speaker 31 can be driven separately from the projector 32. With the configuration, the position of the virtual sound source can be more flexibly set.

Further, for example, a part or the whole of the information processing apparatus 14 can be provided in the drive-type projector 11, or a part or the whole of the drive-type projector 11 can be provided in the information processing apparatus 14. For example, the moving amount calculation unit 106 may be provided in the drive-type projector 11 instead of in the information processing apparatus 14. In this case, the I/F unit 101 of the information processing apparatus 14 acquires information regarding the moving direction and the moving amount of the projection area from the drive-type projector 11, and supplies the information to the control unit 108. Then, the image control unit 111 of the control unit 108 controls the display image range on the basis of the acquired information.

Furthermore, for example, a part or the whole of the sensor unit 12 may be provided in the drive-type projector 11 or the information processing apparatus 14.

Further, the present technology can be applied to a case where the information processing apparatus 14 does not control the drive unit 34, and the drive-type projector 11 moves the projection area without the control of the information processing apparatus 14. That is, even in this case, the image control unit 111 can calculate or predict the moving direction and the moving amount of the projection area on the basis of the control information of the drive unit 34, and control the display image range, similarly to the above-described method.

Furthermore, the configuration of the drive unit 34 is not limited to the above-described example, and another configuration can be adopted. Even in the case of adopting another configuration, the moving direction and the moving amount of the projection area may be calculated or predicted on the basis of the control information, the characteristics, and the like of the drive unit 34, similarly to the above-described embodiment.

Further, in the above description, an example of moving the projection area by changing the direction of the projector 32 has been described. However, for example, the projection area may be moved by reflecting an image projected from the projector 32 at a reflector such as a mirror to change the direction of the reflector. In this case, for example, the moving amount calculation unit 106 may just calculate or predict the moving direction and the moving amount of the projection area on the basis of the control information, the characteristics, and the like of the drive unit that drives the reflector.

Similarly, in the above description, a case of moving the position of the virtual sound source by changing the direction of the reflective speaker 31 has been described. However, for example, the position of the virtual sound source may be moved by reflecting the output sound output from the reflective speaker 31 at a reflector such as a mirror to change the direction of the reflector.

Further, for example, the depth information in the display space may be acquired using a sensor other than the depth sensor 33.

Further, the present technology can also be applied to a handy-type projector that moves the projection area by changing the direction by a user by hand, for example.

Figure 12:
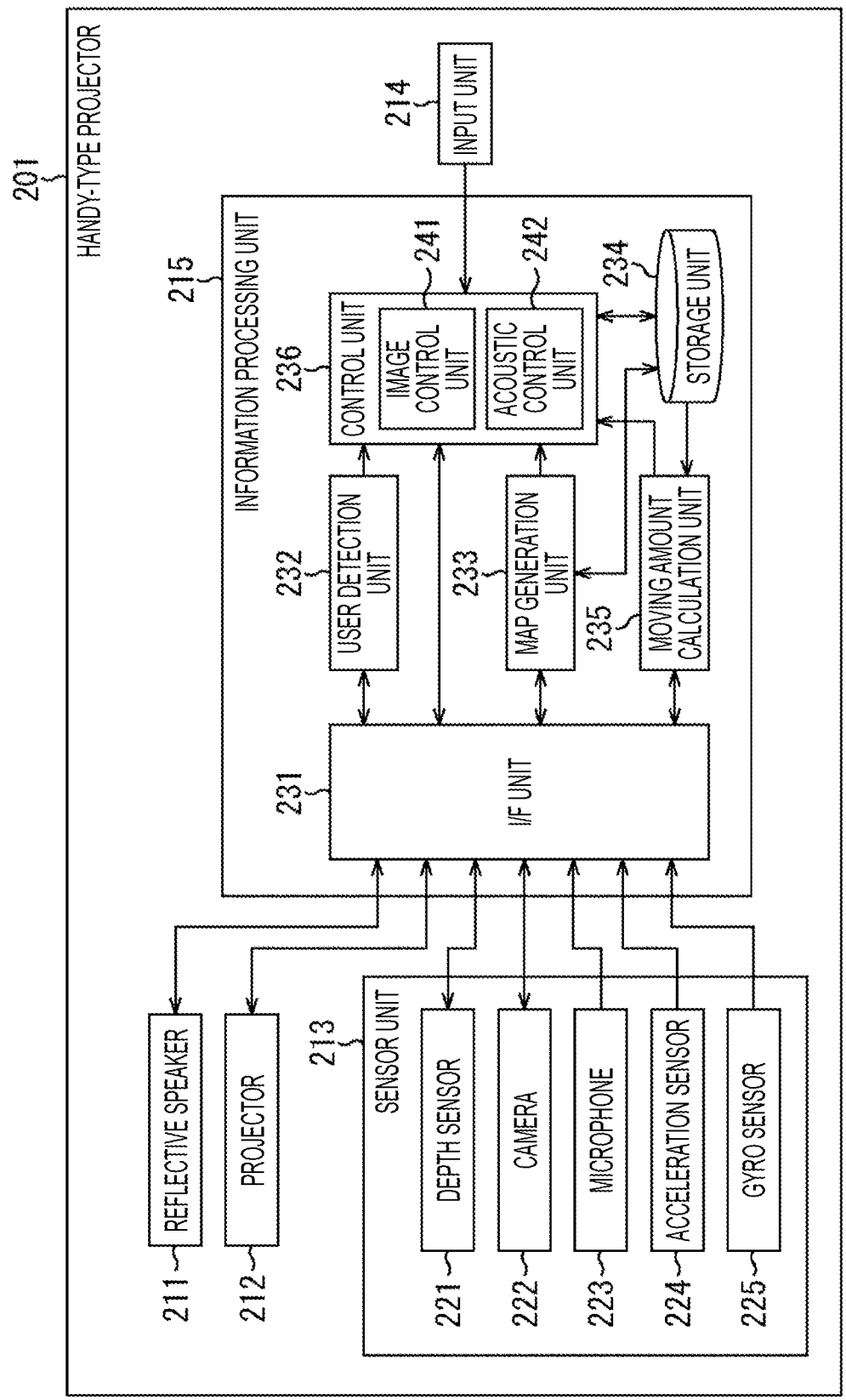
FIG. 12 is a block diagram illustrating an embodiment of a handy-type projector to which the present technology is applied.

FIG. 12 is a block diagram illustrating a configuration example of a handy-type projector 201.

The handy-type projector 201 includes a reflective speaker 211, a projector 212, a sensor unit 213, an input unit 214, and an information processing unit 215.

The reflective speaker 211 is a speaker that generates a virtual sound source at a reflection position by outputting and reflecting an output sound at a wall or the like, similarly to the reflective speaker 31 in FIG. 1.

The projector 212 projects an image based on image data supplied from the information processing unit 215 onto a wall, an object, or the like in a display space, similarly to the projector 32 in FIG. 1.

The sensor unit 213 includes a depth sensor 221, a camera 222, a microphone 223, an acceleration sensor 224, and a gyro sensor 225.

The depth sensor 221 captures a distance image indicating a distance from the depth sensor 221, using infrared light, and supplies the captured distance image to the information processing unit 215, similarly to the depth sensor 33 in FIG. 1.

The camera 222 captures surroundings of the handy-type projector 201, and supplies an image obtained as a result of the capturing to the information processing unit 215. The image captured by the camera 222 is used, for example, for detection of a position, a gaze direction, a gesture, and the like of a user around the handy-type projector 201.

The microphone 223 is used, for example, for detection of a reflected sound with respect to the output sound from the reflective speaker 211, similarly to the microphone 63 in FIG. 1. The microphone 223 supplies an audio signal indicating the detected sound to the information processing unit 215.

The acceleration sensor 224 detects accelerations in three axial directions of an K axis, a Y axis, and a Z axis of the handy-type projector 201, for example. The acceleration sensor 224 supplies a signal indicating a detection result to the information processing unit 215.

The gyro sensor 225 detects, for example, angular speeds about three axes of a yaw axis, a pitch axis, and a roll axis of the handy-type projector 201. The gyro sensor 225 supplies a signal indicating a detection result to the information processing unit 215.

The input unit 214 includes, for example, an operation device and the like, and is used for input of commands, data, and the like (for example, image data and audio data) to a control unit 236 of the information processing unit 215.

The information processing unit 215 includes an interface (I/F) unit 231, a user detection unit 232, a map generation unit 233, a storage unit 234, a moving amount calculation unit 235, and a control unit 236.

The I/F unit 231 is configured by a communication device, a connector, and the like, for example, similarly to the I/F unit 101 in FIG. 1. The I/F unit 231 transmits and receives data and the like to and from the reflective speaker 211, the projector 212, the depth sensor 221, the camera 222, the microphone 223, the acceleration sensor 224, and the gyro sensor 225. In addition, the I/F unit 231 supplies the received data and the like to each unit of the information processing unit 215, and acquires data or the like to be transmitted from each unit of the information processing unit 215.

The user detection unit 232 detects, for example, the position, the gaze direction, the gesture, and the like of the user around the handy-type projector 201 on the basis of an image captured by the camera 222. The user detection unit 232 supplies a detection result to the control unit 236.

Note that any method can be adopted as the detection method of the user detection unit 232.

The map generation unit 233 generates an integrated space map, using the distance image captured by the depth sensor 221 and the detection result of the reflected sound to the output sound of the reflective speaker 211, the reflected sound being detected by the microphone 223, similarly to the map generation unit 104 in FIG. 1. The map generation unit 233 causes the storage unit 234 to store the generated integrated space map.

The moving amount calculation unit 235 detects a posture and a motion of the handy-type projector 201 on the basis of information from the sensors (for example, the acceleration sensor 224 and the gyro sensor 225) that detect the motion of the handy-type projector 201. Furthermore, the moving amount calculation unit 235 calculates a moving direction and a moving amount of the projection area of the projector 212 on the basis of a detection result of the posture and the motion of the handy-type projector 201. The moving amount calculation unit 235 supplies a calculation result of the moving direction and the moving amount of the projection area to the control unit 236.

Alternatively, the moving amount calculation unit 235 predicts the posture and the motion of the handy-type projector 201 on the basis of the information from the sensors that detect the motion of the handy-type projector 201. Furthermore, the moving amount calculation unit 235 predicts the moving direction and the moving amount of the projection area of the projector 212 on the basis of a prediction result of the posture and the motion of the handy-type projector 201. The moving amount calculation unit 235 supplies a prediction result of the moving direction and the moving amount of the projection area to the control unit 236. Note that, for predicting the moving direction and the moving amount of the projection area, for example, the technology disclosed in Japanese Patent Application Laid-Open No. 2015-72534 can be used.

Here, the moving amount calculation unit 235 can promptly calculate or predict the moving amount of the projection area, using the integrated space map, similarly to the moving amount calculation unit 106 of the information processing apparatus 14 in FIG. 1.

The control unit 236 includes an image control unit 241 and an acoustic control unit 242.

The image control unit 241 controls display of an image by the projector 212. For example, the image control unit 241 controls the projector 212 via the I/F unit 231 to control content and display timing of the image to be displayed, and the like.

Further, the image control unit 241 controls a display image range on the basis of the calculation result or the prediction result of the moving direction and the moving amount of the projection area, similarly to the image control unit 111 of the information processing apparatus 14 in FIG. 1. With the control, the display image range is moved in accordance with the motion of the handy-type projector 201, the image is localized at a predetermined position, and occurrence of shift and shake, and the like of the image is suppressed, similarly to the AV system 10 in FIG. 1. That is, the position of the image projected by the projector 212 is stabilized.

The acoustic control unit 242 controls an output of the output sound of the reflective speaker 211. For example, the acoustic control unit 242 controls the reflective speaker 211 via the I/F unit 231 to control content, a volume, output timing, and the like of the output sound.

Note that, as the sensors that detect the motion of the handy-type projector 201 (projector 212), sensors other than the acceleration sensor 224 and the gyro sensor 225 or a combination of sensors may be used.

Modification Regarding Space Map

The information included in the space map is not limited to the above-described example and can be changed as necessary. For example, color information, texture information, or the like of each position in the display space may be included in the space map on the basis of the information acquired by the camera 61 or the like.

Further, the space map does not necessarily need to include the information of all the areas in the display space, and may just include at least information of the projection target area that serves as the target on which at least an image is projected.

Furthermore, in the above description, an example of generating and using the integrated space map by integrating the first space map and the second space map has been described. However, only one of the first space map and the second space map can be generated and used.

Further, a part or the whole of the information of the space map may be provided to the information processing apparatus 14 or the information processing unit 215 from an outside.

Other Modifications

In the above description, an example of using the moving direction and the moving amount of the projection area for the control of the display image range has been described. However, information (projection area information) regarding a range of a projection area in a display space when the projector next projects an image, and other than the moving direction and the moving amount of the projection area can be used. For example, the position of the projection area may be directly calculated or predicted without using the moving direction and moving amount of the projection area, and used for control of the display image range.

Further, the type of the image to which the present technology is applied is not particularly limited, and for example, a moving image, a still image, a two-dimensional image, a three-dimensional image, or the like is adopted. Note that, in the case of a moving image, the image displayed in the display space is changed as time passes. Therefore, for example, when setting the display image range corresponding to the projection area, the display image range may just be set using, as a target, the image set to be displayed in the display space at the point of time when projecting the image in the display image range.

Further, the above-described second method for countermeasures against color breaking can also be applied to a case in which a display device (for example, a liquid crystal display, an organic EL display, or the like) other than the projector causes a user to recognize an image in one color by displaying images in different colors at different times in a time division manner with respect to one image. For example, in the case where a display device having a display screen is moved relative to the user who views the display screen, the second method for countermeasures against color breaking can be applied. To be specific, for example, in the case where the display device is moved relative to the user, occurrence of the color breaking can be suppressed by shifting display positions of the images in colors in the display screen by the above-described method on the basis of the moving direction and the moving amount of the display device.

Configuration Example of Computer

The above-described series of processing of the information processing apparatus 14 and the information processing unit 215 can be executed by hardware or by software. In the case of executing the series of processing by software, a program that configures the software is installed in a computer. Here, the computer includes a computer incorporated in dedicated hardware, a general-purpose personal computer capable of executing various functions, and the like by installing various programs, for example.

Figure 13:
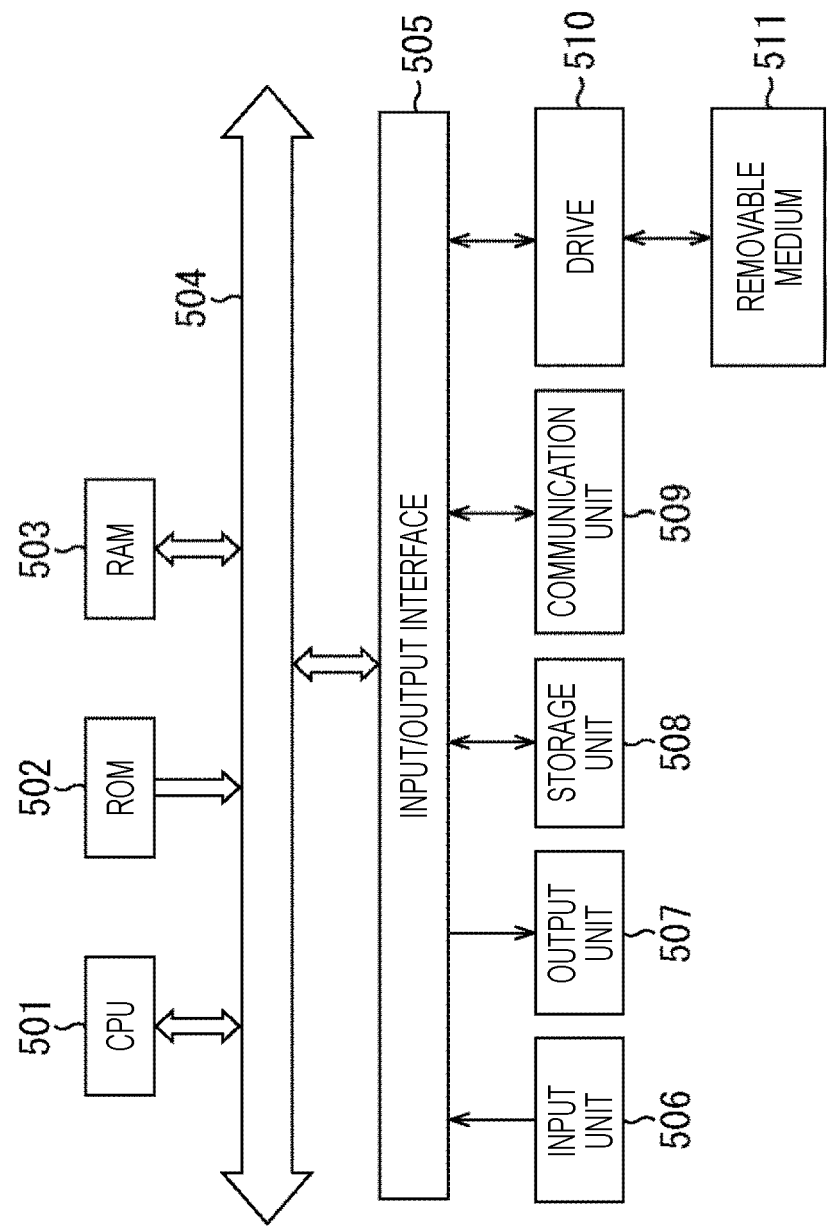
FIG. 13 is a block diagram illustrating a configuration example of a computer.

FIG. 13 is a block diagram illustrating a configuration example of hardware of a computer that executes the above-described series of processing by a program.

In a computer, a central processing unit (CPU) 501, a read only memory (ROM) 502, and a random access memory (RAM) 503 are mutually connected by a bus 504.

Further, an input/output interface 505 is connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker, and the like. The storage unit 508 includes a hard disk, a nonvolatile memory, and the like. The communication unit 509 includes a network interface and the like. The drive 510 drives a removable medium 511 such as a magnetic disk, an optical disk, a magneto-optical disk, a semiconductor memory, or the like.

In the computer configured as described above, the CPU 501 loads a program stored in the storage unit 508 into the RAM 503 and executes the program via the input/output interface 505 and the bus 504, whereby the above-described series of processing is performed, for example.

The program to be executed by the computer (CPU 501) can be recorded on the removable medium 511 as a package medium or the like, for example, and provided.

Further, the program can be provided via a wired or wireless transmission medium such as a local area network, the Internet, or digital broadcast.

In the computer, the removable medium 511 is attached to the drive 510, whereby the program can be installed in the storage unit 508 via the input/output interface 505. Further, the program can be received by the communication unit 509 via a wired or wireless transmission medium and installed in the storage unit 508. Other than the above method, the program can be installed in the ROM 502 or the storage unit 508 in advance.

Note that the program executed by the computer may be a program processed in chronological order according to the order described in the present specification or may be a program executed in parallel or at necessary timing such as when a call is made.

Further, a plurality of computers may cooperate to perform the above-described processing. Then, a computer system is configured by one or a plurality of computers that performs the above-described processing.

Further, in the present specification, the term "system" means a group of a plurality of configuration elements (devices, modules (parts), and the like), and whether all the configuration elements are in the same casing is irrelevant. Therefore, a plurality of devices that is housed in separate casings and connected via a network, and one device that houses a plurality of modules in one casing are both systems.

Further, embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Further, the steps described in the above-described flowcharts can be executed by one device or can be executed by a plurality of devices in a shared manner.

Furthermore, in the case where a plurality of processes is included in one step, the plurality of processes included in the one step can be executed by one device or can be shared and executed by a plurality of devices.

Further, the effects described in the present specification are merely examples and are not limited, and other effects may be exhibited.

Further, for example, the present technology can have the following configurations.

(1)

An information processing apparatus including:

an acquisition unit configured to acquire projection area information that is information regarding a range of a projection area of a projector; and an image control unit configured to control a display image range that is a range of contents to be displayed in the projection area on the basis of the projection area information.

(2)

The information processing apparatus according to (1), in which the projector projects an image of a first color corresponding to one image that configures an image of the contents, and an image of a second color corresponding to the one image and different from the first color at different times, and the image control unit controls a position of the image of the first color or the image of the second color on the basis of the projection area information.

(3)

The information processing apparatus according to (2), in which the image control unit performs control such that positions of the image of the first color and the image of the second color, the positions being viewed from the projector, are further separated as a speed at which the projection area of the projector moves becomes faster, (4)

The information processing apparatus according to (1), in which the projector projects an image of a first color corresponding to one image that configures an image of the contents, and an image of a second color corresponding to the one image and different from the first color at different times, and the image control unit stops movement of the projector in a projecting direction by a drive unit that controls the projecting direction of the projector until projection of the image of the first color and the image of the second color corresponding to the one image is completed.

(5)

The information processing apparatus according to (4), in which the image control unit stops the movement of the projector in the projecting direction by the drive unit before starting projection of the one image, and resumes the movement of the projector in the projecting direction by the drive unit after the projection of the image of the first color and the image of the second color corresponding to the one image is completed.

(6)

The information processing apparatus according to any one of (1) to (5), in which the projection area information is calculated on the basis of control information of a drive unit that controls a projecting direction of the projector.

(7)

The information processing apparatus according to (6), in which the projection area information includes a prediction value regarding the range of the projection area based on the control information and a characteristic of the drive unit.

(8)

The information processing apparatus according to (6) or (7), further including:

a calculation unit configured to calculate the projection area information on the basis of the control information of the drive unit.

(9)

The information processing apparatus according to (8), further including:

the projector; and the drive unit.

(10)

The information processing apparatus according to any one of (1) to (5), in which the projection area information is calculated on the basis of information from a sensor that detects a motion of the projector.

(11)

The information processing apparatus according to (10), in which the projection area information includes a prediction value regarding the range of the projection area based on the information from the sensor.

(12)

The information processing apparatus according to (10) or (11), further including:

a calculation unit configured to calculate the projection area information on the basis of the information from the sensor.

(13)

The information processing apparatus according to (12), further including:

the projector; and the sensor.

(14)

The information processing apparatus according to any one of (1) to (13), in which the projection area information includes at least one of information indicating a position of the projection area and information indicating a moving direction and a moving amount of the projection area.

(15)

The information processing apparatus according to (14), in which the position of the projection area, or the moving direction and the moving amount of the projection area is calculated on the basis of a distance between the projector and the projection area based on depth information of a projection target area serving as a target on which an image is projected.

(16)

The information processing apparatus according to (15), further including:

a map generation unit configured to generate a map including the depth information of the projection target area.

(17)

The information processing apparatus according to (15) or (16), in which the image control unit controls the display image range on the basis of image position information indicating a display position of an image set in advance to the projection target area.

(18)

The information processing apparatus according to any one of (1) to (17), in which the image control unit sets the display image range on the basis of the projection area information, and causes the projector to project an image corresponding to the set display image range.

(19)

An information processing method including:

an acquisition control step of controlling acquisition of projection area information that is information regarding a range of a projection area of a projector; and an image control step of controlling a display image range that is a range of contents to be displayed in the projection area on the basis of the projection area information.

(20)

A program for causing a computer system to execute processing including:

an acquisition control step of controlling acquisition of projection area information that is information regarding a range of a projection area of a projector; and an image control step of controlling a display image range that is a range of contents to be displayed in the projection area on the basis of the projection area information.

REFERENCE SIGNS LIST

10 AV system
11 Drive-type projector
12 Sensor unit
13 Operation unit
14 Information processing apparatus
31 Reflective speaker
32 Projector
33 Depth sensor
34 Drive unit
41 Pan motor
42 Tilt motor
43 Motor control unit 61 Camera
62 Fisheye camera
63 Microphone
81 Pointing device
102 Pointing position detection unit
103 User detection unit
104 Map generation unit
106 Moving amount calculation unit
108 Control unit
111 Image control unit
112 Acoustic control unit
201 Handy-type projector
211 Reflective speaker
212 Projector
213 Sensor unit
215 Information processing unit
221 Depth sensor
222 Camera
223 Microphone
224 Acceleration sensor
225 Gyro sensor
232 User detection unit
233 Map generation unit
235 Moving amount calculation unit
236 Control unit
241 Image control unit
242 Acoustic control unit

The invention claimed is:

1. An information processing apparatus comprising:
an acquisition unit configured to acquire projection area information that is information regarding a range of a projection area of a projector; and
an image control unit configured to control a display image range that is a range of contents to be displayed in the projection area on the basis of the projection area information,
wherein the projector projects
an image of a first color corresponding to one image that configures an image of the contents, and
an image of a second color corresponding to the one image and different from the first color at different times,
wherein the image control unit stops movement of the projector in a projecting direction by a drive unit that controls the projecting direction of the projector until projection of the image of the first color and the image of the second color corresponding to the one image is completed, and
wherein the acquisition unit and the image control unit are each implemented via at least one processor.

2. The information processing apparatus according to claim 1, wherein the image control unit controls a position of the image of the first color or the image of the second color on the basis of the projection area information.

3. The information processing apparatus according to claim 1, wherein
the image control unit stops the movement of the projector in the projecting direction by the drive unit before starting projection of the one image, and resumes the movement of the projector in the projecting direction by the drive unit after the projection of the image of the first color and the image of the second color corresponding to the one image is completed.

4. The information processing apparatus according to claim 1, wherein
the projection area information is calculated on the basis of control information of the drive unit that controls the projecting direction of the projector.

5. The information processing apparatus according to claim 4, wherein
the projection area information includes a prediction value regarding the range of the projection area based on the control information and a characteristic of the drive unit.

6. The information processing apparatus according to claim 4, further comprising:
a calculation unit configured to calculate the projection area information on the basis of the control information of the drive unit,
wherein the calculation unit is implemented via at least one processor.

7. The information processing apparatus according to claim 6, further comprising:
the projector; and
the drive unit.

8. The information processing apparatus according to claim 1, wherein
the projection area information is calculated on the basis of information from a sensor that detects a motion of the projector.

9. The information processing apparatus according to claim 8, wherein
the projection area information includes a prediction value regarding the range of the projection area based on the information from the sensor.

10. The information processing apparatus according to claim 8, further comprising:
a calculation unit configured to calculate the projection area information on the basis of the information from the sensor,
wherein the calculation unit is implemented via at least one processor.

11. The information processing apparatus according to claim 10, further comprising:
the projector; and
the sensor.

12. The information processing apparatus according to claim 1, wherein
the projection area information includes at least one of information indicating a position of the projection area and information indicating a moving direction and a moving amount of the projection area.

13. The information processing apparatus according to claim 12, wherein
the position of the projection area, or the moving direction and the moving amount of the projection area is calculated on the basis of a distance between the projector and the projection area based on depth information of a projection target area serving as a target on which an image is projected.

14. The information processing apparatus according to claim 13, further comprising:
a map generation unit configured to generate a map including the depth information of the projection target area,
wherein the map generation unit is implemented via at least one processor.

15. The information processing apparatus according to claim 1, wherein the image control unit sets the display image range on the basis of the projection area information, and causes the projector to project an image corresponding to the set display image range.

16. The information processing apparatus according to claim 1, wherein
the projection area information comprises a moving speed at which the projection area of the projector moves.

17. An information processing apparatus comprising:
an acquisition unit configured to acquire projection area information that is information regarding a range of a projection area of a projector; and
an image control unit configured to control a display image range that is a range of contents to be displayed in the projection area on the basis of the projection area information,
wherein the projector projects
an image of a first color corresponding to one image that configures an image of the contents, and
an image of a second color corresponding to the one image and different from the first color at different times,
wherein the image control unit performs control such that positions of the image of the first color and the image of the second color, the positions being viewed from the projector, are further separated as a speed at which the projection area of the projector moves becomes faster, and
wherein the acquisition unit and the image control unit are each implemented via at least one processor.

18. An information processing apparatus comprising:
an acquisition unit configured to acquire projection area information that is information regarding a range of a projection area of a projector; and
an image control unit configured to control a display image range that is a range of contents to be displayed in the projection area on the basis of the projection area information,
wherein the projection area information includes at least one of information indicating a position of the projection area and information indicating a moving direction and a moving amount of the projection area,
wherein the position of the projection area, or the moving direction and the moving amount of the projection area is calculated on the basis of a distance between the projector and the projection area based on depth information of a projection target area serving as a target on which an image is projected, wherein the image control unit controls the display image range on the basis of image position information indicating a display position of an image set in advance to the projection target area, and
wherein the acquisition unit and the image control unit are each implemented via at least one processor.

19. An information processing method, executed by at least one processor, the method comprising:
controlling acquisition of projection area information that is information regarding a range of a projection area of a projector; and
controlling a display image range that is a range of contents to be displayed in the projection area on the basis of the projection area information,
wherein the projector projects
an image of a first color corresponding to one image that configures an image of the contents, and
an image of a second color corresponding to the one image and different from the first color at different times, and
wherein movement of the projector in a projecting direction is stopped, by a drive unit that controls the projecting direction of the projector, until projection of the image of the first color and the image of the second color corresponding to the one image is completed.

20. A non-transitory computer-readable storage medium having embodied thereon a program, which when executed by a computer system causes the computer system to execute a method, the method comprising:
controlling acquisition of projection area information that is information regarding a range of a projection area of a projector; and
controlling a display image range that is a range of contents to be displayed in the projection area on the basis of the projection area information,
wherein the projector projects
an image of a first color corresponding to one image that configures an image of the contents, and
an image of a second color corresponding to the one image and different from the first color at different times, and
wherein movement of the projector in a projecting direction is stopped, by a drive unit that controls the projecting direction of the projector, until projection of the image of the first color and the image of the second color corresponding to the one image is completed.

* * * * *